United States Patent [19]

Lauermann et al.

[11] Patent Number: 4,880,639

[45] Date of Patent: Nov. 14, 1989

[54] TASTE OF HENS' EGGS

[75] Inventors: Georg Lauermann, Bad Segeberg; Clemens Thobe, Horst in Holstein, both of Fed. Rep. of Germany

[73] Assignee: Henkel Kommandigesellschaft auf Aktien, Duesseldorf, Fed. Rep. of Germany

[21] Appl. No.: 233,701

[22] Filed: Aug. 18, 1988

[30] Foreign Application Priority Data

Aug. 20, 1987 [DE] Fed. Rep. of Germany ....... 3727735

[51] Int. Cl.⁴ ................................................ A23K 1/00
[52] U.S. Cl. ...................................... 426/2; 426/651; 426/807
[58] Field of Search ............................. 426/2, 651, 807

[56] References Cited

U.S. PATENT DOCUMENTS

| | | | |
|---|---|---|---|
| 3,128,191 | 4/1964 | Williams | 426/2 |
| 3,159,489 | 12/1964 | Murphy et al. | 426/2 |
| 4,125,629 | 11/1978 | Rossi | 426/2 |
| 4,738,853 | 4/1988 | Horrobin | 426/630 |

*Primary Examiner*—R. B. Penland
*Attorney, Agent, or Firm*—Ernest G. Szoke; Wayne C. Jaeschke; Henry E. Millson, Jr.

[57] ABSTRACT

Drinking water, mixed feeds and/or fodders for laying hens having a content of essential oils for improving the flavor of the hen' eggs.

5 Claims, No Drawings

TASTE OF HENS' EGGS

BACKGROUND OF THE INVENTION

1. Field of the Invention

This invention relates to drinking water, mixed feeds, and fodders for laying hens, and to a method for improving the taste of hens' eggs.

2. Statement of Related Art

Most of the hens' eggs on sale today come from battery hens or free-range hens. These hens are given mixed feeds and/or fodders prepared under the latest animal nutrition provisions to meet the high demands of maintenance and laying performance of the hens. In the following, "mixed feeds" are understood to be the mixes prepared under the guidelines of German legislation on feedstuffs; all other mixes are referred to as "fodders".

Mixed feeds and fodders for laying hens are often very deficient in their formulation because they only take into account the formation of the eggs and not their taste. Because of this, the eggs of hens fed with such mixed feeds and/or fodders can have an insipid taste, i.e. they lack the characteristic taste of eggs.

It is known that flavorings, such as vanilla, saccharin, or sodium glutamate may be added to fodder mixes for hogs (cf. for example Ullmanns Encyclopadie der technischen Chemie 12, 47 (1976)). Such additives improve the fodder intake of the animals.

It is also known that the feeding of fishmeal, gossypose-containing cottonseed extraction waste, or relatively large quantities of rape extraction waste produces negative changes of odor and taste in hens' eggs (see, for example, G. Gebhardt "Tierernaherung", VEB Deutscher Landwirtschaftsverlag Berlin (1981)).

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to improve the taste of hens' eggs, especially chicken eggs, although the taste of the eggs of other fowl, e.g. ducks and geese, can also be improved in accordance with the invention.

It has now surprisingly been found that hens' eggs have a pleasantly aromatic taste if drinking water, and/or mixed feeds and/or fodders to which essential oils have been added are fed to the laying hens. It is understood that the term "mixed feed" when used in the claims appended hereto includes both mixed feeds and fodders.

Accordingly, the present invention relates to mixed feeds and/or fodders for laying hens based on various types of cereals, which may contain as further constituents by products of cereals, soybean waste, and other protein compounds of vegetable and/or animal origin, fodder fats of vegetable and/or animal origin, minerals, trace elements and/or vitamins, and/or to drinking water for laying hens, wherein the mixed feeds and/or fodders contain from 10 to 6000 ppm of essential oils, and the drinking water contains from 1 to 70,000 ppm essential oils.

The cereal by-products include, for example, brans, secondary meals, tapioca meal, cassava meal, alfalfa green meal, and grass meal.

The present invention also relates to a method for improving the taste of hens' eggs wherein mixed feeds and/or fodders for laying hens based on various types of cereals, which may contain as further constituents cereal by-products, soybean waste, and other protein components of vegetable and/or animal origin, fodder fats of vegetable and/or animal origin, minerals, trace elements and/or vitamins, are mixed with 10 to 6000 ppm essential oils, and/or drinking water is mixed with 1 to 70,000 ppm essential oils, and the resulting mixtures are subsequently fed to laying hens.

The mixed feeds and/or fodders acccording to the invention preferably contain from 10 to 2,000 ppm essential oils. In the context of the invention, "essential oils" are understood to be odoriferous and aromatic substances of complex composition present in plants, more especially in flowers, seeds, fruit shells, leaves and/or stems, pseudo-natural and/or artificial perfumes and flavorings, if desired in combination with flavorings known for use in mixed feeds and/or fodders for hogs, for example vanilla, which give hens' eggs agreeable flavor and odor properties.

Pseudo-natural perfumes and flavorings are synthetically prepared and are chemically identical with natural perfumes and flavorings. Artificial perfumes and flavorings, which are also synthetically prepared, differ in their chemical structures from natural perfumes and flavorings, but give hens' eggs flavor and odor characteristics which correspond to the flavor enhancement of hens' eggs obtained with natural and/or pseudo-natural perfumes and flavorings.

Essential oils having the odor and flavor characteristics of dandelion, sage, camomile, lavender, fennel, camphor, thyme, lovage, rosemary, tarragon, basil, chervil, and/or savory are preferred as additives for drinking water, mixed feeds and/or fodders. Essential oils having the odor and flavor characteristic of thyme, basil, sage, camomile, lavender, camphor, rosemary, tarragon and/or chervil are particularly preferred.

Perfumes and flavorings of natural origin which give hens' eggs agreeable flavor and odor properties can be added to drinking water, mixed feeds and/or fodders for laying hens in the form of dried plants, if desired in combination with (i.e. mixed with) pseudo-natural and/or artificial perfumes and flavorings and/or flavorings known per se for mixed feeds and/or fodders. According to the invention, however, natural perfumes and flavorings can be used as such, i.e. perfumes and flavorings are isolated by known physical methods, for example mechanical separation, extraction and/or distillation techniques, from the corresponding parts of plants (Ullmanns Enzyklopadie der Chemie, 4th Edition, Vol. 20, page 252 (1981)), and these natural perfumes and flavorings are then added directly to drinking water, feed and/or fodder. Alternatively, the natural perfumes and flavorings can be mixed with pseduo-natural and/or artificial perfumes and flavorings before use. Also, the resulting mixtures can be added to supporting materials, for example vegetable and/or animal fats, powderform supporting substances, such as kaolin, carbonate and phosphate of lime, boll and/or secondary meals, brans, flow and/or pressing aids, and the resulting product mixed, if desired, with flavorings known per se for mixed feeds and/or fodders, and then added with mixing to mixed feeds and/or fodders for laying hens.

The invention will be illustrated but not limited by the following examples.

EXAMPLES

Four laying hens (test animals) kept in a coop were fed with a standard commercially available mixed feed consisting of 16% by weight wheat, 17% by weight corn meal, 12% by weight zein fodder, 3% by weight corn fodder meal, 2.5% by weight zein, 14% by weight extracted soybean waste, 18% by weight cassava meal, 8.08% by weight calcium carbonate, 3% by weight animal meal, 2.5% by weight soybean oil, 1.5% by weight middlings, 1.5% by weight molasses, 0.6% by weight trace element vitamin premix, 0.3% by weight calcium/sodium phosphate and 0.02% by weight dl-methionine (additives per kg: 12,000 IU vitamin A, 2500 IU vitamin D3, 10 mg vitamin E, fat stabilizer (BHT), canthaxanthine; ingredients: 16% by weight crude protein, 0.32% by weight methionine, 4.5% by weight crude fat, 13% by weight crude ash, 3.5% by weight calcium, 0.5% by weight phosphorus, 0.15% by weight sodium; energy value poultry=72), to which 800 ppm of a mixture of essential oils had been added. The mixture of essential oils consisted of equal parts by weight of natural perfumes and flavorings present in sage, rosemary, thyme, lavender and camphor. The perfumes and flavorings isolated by physical methods were applied to rape meal (ratio by weight rape oil to essential oil=9:1) and were added to and mixed in this form with the commercial mixed feed.

Four other laying hens (control animals) likewise kept in a coop were given the same commercially available mixed feed, but without the addition of essential oils. In no case was the intake of feed by the animals affected. After the beginning of feeding, the eggs were collected for the next 14 days, boiled for 4 minutes for organoleptic testing and distributed among 25 people for tasting and evaluation. The tasters did not known whether the eggs came from the test animals or the control animals.

All the tasters judged the taste of the eggs which came from the test animals to be agreeable, aromatic and full-flavored while the taste of the eggs from the control animals was described as insipid.

We claim:

1. A method for improving the flavor of hens' eggs comprising feeding the hens a mixed feed containing from about 10 to about 6,000 ppm of at least one essential oil.

2. The method of claim 1 wherein the mixed feed contains from about 10 to about 2,000 ppm of at least one essential oil.

3. The method of claim 1 wherein the at least one essential oil has the odor and flavor characteristics of one or more of the following: dandelion, sage, camomile, lavender, fennel, camphor, thyme, lovage, rosemary, tarragon, chervil, basil, or savory.

4. A method for improving the flavor of hens' eggs comprising feeding the hens drinking water containing from about 1 to about 70,000 ppm of at least one essential oil.

5. The method of claim 4 wherein the at least one essential oil has the odor and flavor characteristics of one or more of the following: dandelion, sage, camomile, lavender, fennel, camphor, thyme, lovage, rosemary, tarragon, chervil, basil, or savory.

* * * * *